June 23, 1942.   E. A. WAGNER   2,287,580
COFFEE MAKER
Filed Oct. 16, 1941
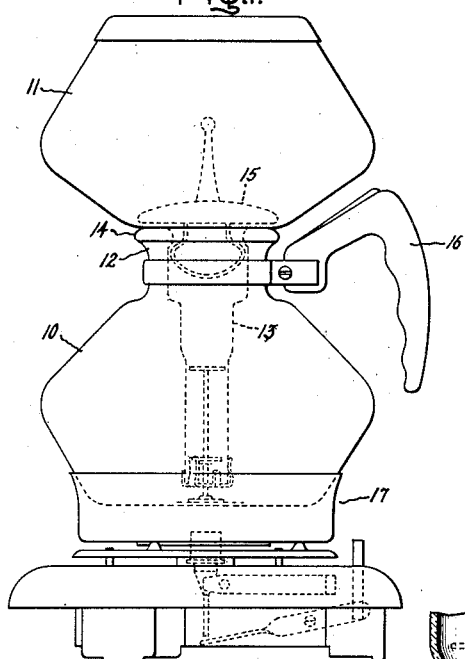
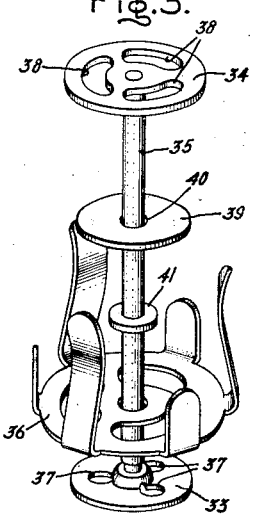
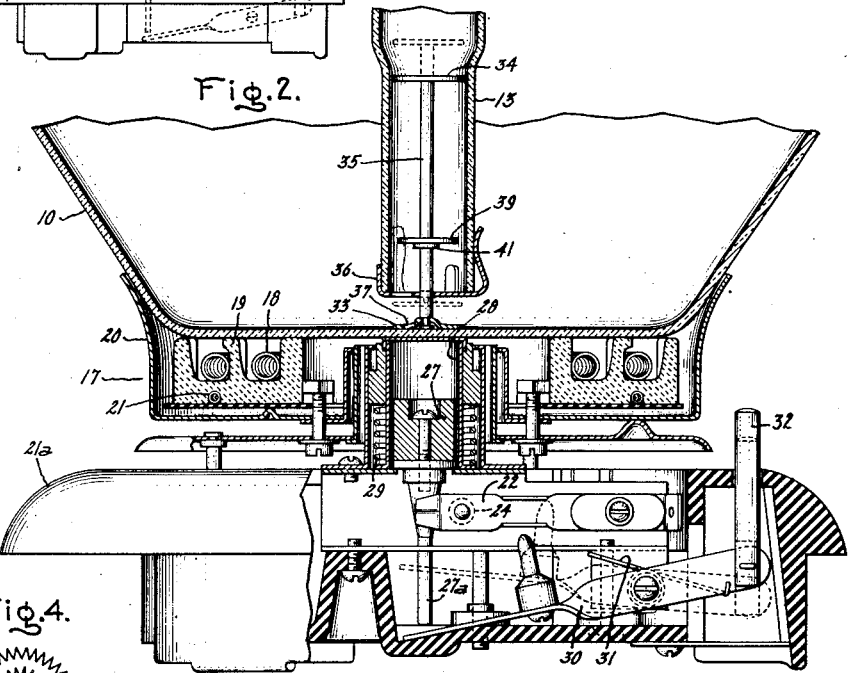
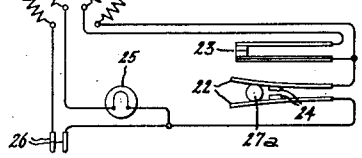
Inventor:
Ernest A. Wagner,
by Harry E. Dunham
His Attorney.

Patented June 23, 1942

2,287,580

UNITED STATES PATENT OFFICE 2,287,580

COFFEE MAKER

Ernest A. Wagner, Milford, Conn., assignor to General Electric Company, a corporation of New York Application October 16, 1941, Serial No. 415,225

5 Claims. (Cl. 219—43)

This invention relates to coffee makers, more particularly to coffee makers of the vacuum-type wherein heated water is transferred from a water heating vessel to a coffee infusion vessel where the brew is made; and thereafter the prepared brew is forced through a filter into the water heating vessel by the vacuum created therein when the heat has been reduced sufficiently; and it has for its object the provision of an improved device of this character.

More specifically, this invention relates to improvements in the automatic coffee maker described and claimed in the copending application of Walter R. Weeks, Serial No. 357,256, filed September 18, 1940, and assigned to the same assignee as this invention. As there described, this coffee maker comprises means for automatically reducing the heat applied to the water heating vessel responsively to the transfer of the water from the water heating vessel to the coffee infusion vessel through the liquid transfer tube which connects these vessels together.

The automatic means of this Weeks application comprises a control element for the heater mounted on the bottom wall of the water heating vessel under the opening in the liquid transfer tube. This element is adapted to be elevated from the bottom wall; and suitable means operate to control the heater to reduce the heat applied to the water heating vessel responsively to this movement of the control element. An actuating member for the control element is mounted within the transfer tube. This member is elevated by the action of the rushing water and steam in the transfer tube to elevate the control element to reduce the heat toward the end of the liquid transfer period.

In one specific form of this coffee maker, the means for controlling the heater is a magnet which when it is dropped from an upper position to a lower one controls the heater to reduce the heat applied to the water heating vessel. And the control element is an armature located in the water heating vessel under the transfer tube and over the magnet so as to hold the magnet in its upper position by the attractive force between the magnet and armature. The armature is attached to the actuating member located in the transfer tube so that when this member is elevated by the action of the rushing fluid in the tube, the armature is raised from the magnet to release the magnet and permit it to fall to its lower position and thereby reduce the heat applied to the water heating vessel.

In order to provide a lifting force sufficiently great to elevate the armature from the magnet at the proper time, the actuating member had to have an area almost as large as the cross-sectional area of the tube. As a result, some obstruction was offered to the flow of the fluid in the tube. This obstruction became particularly objectionable when coffee grounds escaped the filter above the tube and flowed down the tube with the prepared brew. At times, these grounds would dam up and fill the space between the actuating member and tube and prevent the return of the brew to the water heating vessel; and as a rather high vacuum exists in this vessel at this time, it was impossible to separate the two vessels in order to clear the obstruction.

Also because of manufacturing variations in the cross-sectional area of the tube, the small space between the actuating member and the tube varied. This resulted in variations in the lifting force exerted by the fluid on the actuating member, and caused it to be lifted to reduce the heat when various amounts of water remained in the water heating vessel.

This invention contemplates the provision of an improved automatic coffee maker having an improved actuating means which will obviate these difficulties and which possesses further advantages: It will exert a lifting force that is independent of normal manufacturing variations in the diameter of the transfer tube. It will offer a minimum obstruction to the passage of fluid in both directions in the tube. It will be operated to reduce the heat only when the flow of fluid in the tube has attained a certain predetermined velocity. It is further constructed and arranged so that the flowing fluid will exert a minimum lifting force upon it until the predetermined velocity of flow has been attained at which time the lifting force will at once become a maximum.

In accordance with this invention, the actuating means in one form thereof comprises a disklike actuating member located in the transfer tube and connected with the heater control element that is located on the bottom wall of the water heating vessel under the tube. This actuating member has an area only slightly smaller than the minimum diameter of the transfer tube, but it is provided with relatively large openings through which the fluid in the tube can freely flow. Mounted within the tube below the actuating member is a valve washer normally removed from the member and having a diameter which is considerably smaller than the diameter of the tube so that slight variations in the tube diameter cause relatively small variations in the difference in area of the tube and the washer; in other words, the washer offers substantially no obstruction to the flow of fluid in the transfer tube. The washer, however, has an area great enough to close the openings in the actuating member when it is moved up against the member. The washer is moved up against the actuating member only when the rate of flow of fluid up the tube has attained a definite predetermined velocity. When the washer engages the actuating member it closes the openings and seals them so that the fluid pressure acts upon the two members, as on a piston, so as to lift them immediately upwardly in the tube. This upward movement operates the control element for the stove to reduce the heat applied to the water heating vessel to cause the automatic return of the coffee brew after it has been prepared.

For a more complete understanding of this invention, reference should be had to the accompanying drawing in which Fig. 1 is a vertical elevation of an automatic vacuum-type coffee maker embodying this invention; Fig. 2 is a fragmentary view mainly in section illustrating parts of the coffee maker of Fig. 1 and drawn to a larger scale than Fig. 1; Fig. 3 is a perspective view illustrating the controlling element and its actuator arranged in accordance with this invention, and drawn to larger scales than Figs. 1 an. 2; and Fig. 4 is a diagrammatic representation of heating means for the coffee maker and certain control elements therefor.

Referring to the drawing, this invention has been shown in one form as applied to the automatic vacuum-type coffee maker described and claimed in the above-mentioned copending Weeks application, Serial No. 357,256. As shown, this coffee maker comprises a lower water heating vessel 10 and an upper infusion vessel 11. The lower vessel 10 is provided at its upper end with an upright neck 12 within which a depending liquid transfer tube 13 provided on the lower end of the upper vessel 11 is received. A suitable gasket 14, preferably formed of rubber, is inserted in the neck 12 of the lower vessel and is provided with a centrally arranged aperture to receive the tubular extension 13 provided on the upper vessel. As shown, the lower end of the tubular member 13 terminates just above the bottom wall of the water heating vessel 10. Seated within the bottom of the infusion vessel 11 over the mouth of the transfer tube 13 is a suitable filter 15.

It will be understood that in the operation of this coffee maker thus far described, water is placed within the vessel 10, while the coffee grounds are placed within the vessel 11. When the water in the vessel 10 is heated, a pressure is created above the liquid level therein, and eventually this pressure becomes so great that it forces the water through the transfer tube 13 into the infusion vessel 11. This steeps the coffee grounds in this vessel and makes the coffee-brew. When the heat applied to the vessel 10 is reduced, the water vapor therein condenses and the vacuum thereby created is sufficiently great to cause the coffee brew in the vessel 11 to pass quickly through the filter 15 into the vessel 10. After the brew has been made, the upper vessel may be removed and the coffee poured from the lower vessel. The lower vessel is provided with a suitable handle 16, which is used to tilt the vessel to pour the brew.

The two vessels 10 and 11 are supported by a stove 17. This stove comprises a resistance conductor 18 mounted in a suitable insulating brick 19. This brick in turn is mounted in a pan-like casing 20. Also mounted in the brick 19 is a second heating element 21. This heating element 21 is used in a temperature-maintaining circuit after the coffee brew has been returned to the vessel 10. The casing 20 is mounted upon a suitable base 21a.

The heating resistance 18 is controlled responsively to the transfer of water from the water heating vessel 10 to the coffee infusion vessel 11 so that after the water has been transferred to the vessel 11, the heat applied to the vessel 10 is reduced sufficiently to cause the prepared brew to flow to the vessel 10.

The resistance 18 and the resistance 21 are controlled by means of a pair of parallel switch arms 22 and a temperature responsive switch 23 mounted in the base 21a. The switch arms carry cooperating contacts 24 which are biased together by the resiliency of the switch arms. As shown in Fig. 4, these contacts 24 and the switch 23 control the energizing circuit of the resistances 18 and 21.

Preferably, a suitable signal lamp 25 will be provided to give an indication when the coffee brew has been made. As shown in Fig. 4, this lamp is connected in series with the temperature maintaining unit 21.

The heating units 18 and 21 and the signal lamp 25 are electrically supplied by a pair of terminal pins 26. When the switch contacts 24 are closed and the terminals are energized, the main heater 18 will be connected to the terminals to provide a high heat, while the unit 21 and the lamp 25 will be shorted out of the circuit; and when the contacts are open, the units 18 and 21 will be connected in series to the terminals to provide a low temperature maintaining heat, provided the switch 23 is closed at this time. Also at this time, the signal lamp 25 will be connected in series with the resistances.

Arranged in the central axis of the stove is a suitable magnet 27 carrying a depending plunger 27a located between the switch arms 22. The magnet is mounted for vertical movement in a casing 28. This casing 28 is biased upwardly by means of a compression spring 29 so that its upper wall is pressed firmly against the bottom wall of the vessel 10 when it is placed upon the stove. The magnet 27 is biased to its lower position in which it is shown in Fig. 2 by means of gravity, and it is elevated against the force of gravity by means of a suitable lever 30 pivotally mounted on the base, as shown. This lever is biased in a counter-clockwise direction, as viewed in Fig. 2, to its position in which it is shown in full lines in this figure, by means of a spring 31. A plunger 32 is provided for moving the lever against the force of this spring so as to elevate the magnet 27 in its casing 28.

When the magnet 27 is in its lower position, it spreads the switch arms 22 apart so as to prevent the energization of the heating element 18, but when it is elevated, it permits the switch arms to close so as to energize the heating element 18, as fully described in the above-mentioned copending Weeks application, Serial No. 357,256.

The magnet when moved to its upper position is held there by means of an armature 33. The armature 33 is arranged to rest upon the bottom wall of the vessel 10 directly above the magnet 27 so that the magnet attracts itself to the armature and holds itself in its upper position as long as the armature rests upon or is very close to the bottom wall of the vessel 10.

The armature 33 is moved upwardly away from the magnet toward the end of the liquid transfer period by means of an actuating member 34 which is positioned within the transfer tube 13. The member 34 in the particular coffee maker illustrated is of disk-like form, and it is rigidly secured to the upper end of a pin 35. The lower end of this pin is received in an aperture provided for it in a resilient socket 36. The resilient socket is adapted to be fitted to the lower end of the transfer tube, as shown, so as to hold the pin and actuator in assembled relation with the tube. The lower end of the pin is secured to the armature 33. The armature preferably will be provided with apertures 37 and otherwise will be constructed and arranged as is the armature described and claimed in the copending application of W. R. Weeks, Serial No. 377,887, filed February 7, 1941, and assigned to the same assignee as this invention.

The disk-like actuating member 34 has a diameter which is only slightly smaller than the minimum internal diameter of the tube 13. However, it is provided with a series of relatively large apertures 38 through which the liquid transferred by the tube 13 can flow.

Mounted to slide on the pin 35 below the actuator 34 is a valve washer 39 which has a diameter that is materially smaller than the minimum internal diameter of the tube 13 so that the liquid can flow freely through the space between the washer and the tube. The central aperture 40 of the washer which receives the pin 35 has a diameter which is sufficiently large to permit the washer to move freely on the pin.

The washer 39 is arranged to be moved upwardly responsively to the flow of water in the tube when its velocity has attained a predetermined maximum so as to close the apertures 38 and thereby prevent the flow of water past the disk-like member 34. During the normal transfer period, however, the washer 39 rests upon a collar 41 secured to the pin 35 below the actuating member 34, as shown.

In the operation of the device thus far described, it will be understood that when the plunger 32 is depressed it will elevate the magnet 27 so as to permit the switch contacts 24 to close and thereby energize the heater 18 to heat the water in the lower vessel 10. As previously described, the magnet will be held in its upper position by means of the armature 33.

The water after being heated sufficiently will be forced upwardly through the tube by means of the hot air and steam above the water level of the lower vessel, the water freely flowing past the washer 39 and through the apertures 38 in the actuating member up the tube 13 into the coffee infusion vessel 11. Toward the end of the transfer period, the velocity of the fluid flowing in the tube is materially increased. And when it has attained a predetermined high velocity it will lift the washer 39 up the pin 35 to seal the openings 38 in the actuating member. As soon as this occurs, there will be a rapid increase in the pressure exerted on the actuating member and washer by the rising fluid, whereby the actuating member and the armature attached to it will be lifted to their dotted line positions of Fig. 2. This operation releases the magnet 27 and permits it to drop to open the switch contacts 24 and thereby deenergize the heating element 18.

It is to be understood that the fluid velocity which will lift the valve washer to seal the openings 38 in the actuating member will depend upon the diameter of the valve washer and its thickness; that is, upon its diameter and weight. If it be desired that a higher fluid velocity be attained before the washer is elevated, a thicker washer will be used; conversely, if a lower fluid velocity be desired, a thinner washer will be used.

Preferably, the tube 13 will be enlarged somewhat at a point just above the actuating member 34 when it is in its lower position; in other words, the diameter of the tube is enlarged at a point opposite the actuating member when it is in its elevated position, as clearly shown in Fig. 2. This provides added clearance between the actuating member and the tube and thereby releases the fluid so that it can again flow freely up the tube.

The velocity head of the fluid holds the washer 39 and the actuating member 34 in their raised positions until the boiling rate has substantially ceased after the heat has been reduced, whereupon the actuating member and washer fall back to their lower positions.

The brew which has been made and which is forced back into the lower vessel 10 by the vacuum created therein after the heat has been reduced can flow freely through the apertures 38 in the actuating member 34 and past the washer 39.

During the heating operation, the thermostatic switch 23 will have been opened responsively to the rising stove temperature so that even though the magnet 27 has dropped to open the switch contacts 24, the temperature-maintaining circuit through the heating resistances 18 and 21 cannot be established at once. It is only after the coffee brew has been returned to the lower vessel 10 and the stove cooled sufficiently to permit the switch 23 to close so that the temperature-maintaining circuit is established.

It is to be noted that in view of the fact that during the transfer period the water can freely flow past the piston 39 and through the openings 38, it will exert a minimum lifting force upon the actuating member 34; also that this lifting force will become a maximum only when the velocity of the fluid has attained such a predetermined maximum that it will move the washer 39 upwardly to seal the openings 38, whereupon the lifting force on the actuating member immediately becomes a maximum and quickly elevates it. Furthermore, this lifting force is substantially independent of any normal variations in the diameter of the tube; this is, because the diameter of the washer 39 is so small with relation to the internal diameter of the tube normal manufacturing variations have little effect upon the lifting action of the fluid on the washer.

Also, the relatively small washer 39, and the actuating member 34, provided with the relatively large openings 38, offer minimum obstruction to the passage of the water up the tube and the passage of the brewed coffee down the tube; these members not only offer minimum obstruction to the passage of these fluids, but also will not obstruct the return passage of the coffee brew even when small solids, such as coffee grounds, are held in suspension in the brew.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A coffee maker comprising a water heating vessel, a liquid transfer tube leading from said vessel through which the water is forced when it is heated, means for heating said vessel so as to heat the water therein, an actuating member in said tube, said member being provided with an aperture through which the fluid flowing in said tube can freely pass, a valve washer in said tube having an area relatively smaller than the cross-sectional area of said tube so that said fluid can flow freely through said tube around said washer, said washer being normally removed from said aperture, but movable to close said aperture responsively to a predetermined high rate of fluid flow in said tube, whereby the fluid can no longer flow through said aperture and acts upon said actuating member and washer to shift the position of said member in said tube, and a control element for said coffee maker operated responsively to the movement of said actuating member in said tube.

2. A coffee maker comprising a water heating vessel, a liquid transfer tube leading from said vessel through which the water is forced when it is heated, means for heating said vessel, a control element for said heating means located in said vessel under said tube, an actuating member in said tube, a pin connecting said actuating member with said control element, said actuating member having an area only slightly smaller than the cross-sectional area of said tube and being provided with an aperture through which the fluid flowing in said tube can freely pass, a valve washer in said tube having an area relatively smaller than the cross-sectional area of said tube so that fluid can flow freely through said tube around said washer, said washer being mounted for sliding movement upon said pin and normally occupying a position removed from said aperture, but movable to close it responsively to a predetermined high rate of fluid flow in said tube, whereby the fluid can no longer flow through said aperture and acts upon said actuating member to shift its position in said tube and thereby the position of said control element in said bowl, and means operated responsively to the movement of said control element in said bowl for controlling the operation of said heating means to reduce the heat applied to said bowl.

3. In a vacuum-type coffee maker having a water heating vessel, a coffee infusion vessel and a water transfer tube between the two vessels having one end terminating at a point adjacent the lower wall of the water heating vessel, a heater under said water heating vessel for applying heat to the liquid therein, a control element for said heater located in said vessel on its bottom wall under said one end of said tube and adapted to be elevated from said bottom wall, means operated responsively to the movement of said control element from said bottom wall for reducing the heat applied by said heater so as to permit the water vapor in said water heating vessel to condense to thereby create a vacuum for effecting the transfer of the coffee brew to the water heating vessel, an actuating member for said control element located in said tube, a pin connecting said member with said control element, said actuating member having an area only slightly smaller than the cross-sectional area of said tube and being provided with an aperture through which the water and steam can freely pass to said coffee infusion vessel and the coffee brew can freely return to said water heating vessel, a valve washer in said tube mounted for sliding movement upon said pin below said actuating member, said washer having an area relatively smaller than the cross-sectional area of said tube so that water and steam and the coffee brew can freely flow through said tube around the washer, a stop on said pin supporting said washer in a position removed from and below said actuating member, said washer being movable upwardly on said pin to close said aperture responsively to a predetermined high rate of fluid flow in said tube, whereby the fluid can no longer flow through said aperture and acts upon said actuating member to elevate it in said tube and thereby lift said control element from said bottom wall.

4. A coffee maker comprising a water heating vessel, a liquid transfer tube leading from said vessel through which the water is forced when it is heated, heating means for said vessel, a pair of relatively movable cooperating control members for said heating means consisting of a magnet and an armature constructed and arranged to control said heating means to apply heat to said vessel when moved in attractive relation with each other and to reduce the heat applied when moved out of attractive relation with each other, said magnet functioning to maintain said members in said attractive relation, one of said members being mounted in said vessel under said tube and adapted to be elevated in said vessel to move said members out of attractive relation with each other, an actuating member in said tube connected to said one member, said member having an area only slightly smaller than the cross-sectional area of said tube and being provided with an aperture through which the fluid flowing in said tube can pass, a washer in said tube normally removed from said aperture and having an area relatively smaller than the cross-sectional area of said tube so that fluid can flow freely through said tube around said washer, said washer being movable to close said aperture responsively to a predetermined high rate of fluid flow in said tube, whereby the fluid can no longer flow through said aperture and acts upon said actuating member to shift its position in said tube and thereby the position of said one control member in said vessel so as to move said control members out of attractive relation with each other.

5. A coffee maker comprising a water heating vessel, a liquid transfer tube leading from said vessel through which the water is forced when it is heated, means for heating said vessel, a control element for said heating means located in said vessel, an actuating member in said tube connected with said control element, said member being provided with an aperture through which the fluid flowing in said tube can pass, a washer in said tube having an area relatively smaller than the cross-sectional area of said tube so that said fluid can flow freely through said tube around said washer, said washer being normally removed from said aperture, but movable to close said aperture responsively to a predetermined high rate of fluid flow in said tube whereby the fluid can no longer flow through said aperture and acts upon said actuating member to shift its position in said tube and thereby the position of said control element in said vessel, the section of said tube about said actuating member after it has been shifted in said tube being relatively larger than the area of said actuating member so as to provide additional space around said member through which the fluid remaining in said water heating vessel can flow, and means controlling the said heater to reduce the heat applied to said vessel responsively to the movement of said control element by said actuating member.

ERNEST A. WAGNER.